United States Patent [19]

O'Neill et al.

[11] 4,271,989
[45] Jun. 9, 1981

[54] MICRO-METERING SYSTEM

[75] Inventors: Cormac G. O'Neill, Contra Costa County; Parker C. Smiley, Alameda County, both of Calif.

[73] Assignee: Physics International Company, San Leandro, Calif.

[21] Appl. No.: 24,316

[22] Filed: Mar. 27, 1979

[51] Int. Cl.³ .............................................. G01F 11/08
[52] U.S. Cl. ............................ 222/282; 137/625.25; 222/333; 222/335; 222/137
[58] Field of Search ................. 222/43, 282, 305, 307, 222/308, 333, 335, 344, 361, 362, 504, 135, 136, 137, 138, 139; 251/129, 57; 137/625.61, 625.65

[56] References Cited

U.S. PATENT DOCUMENTS

| 2,864,535 | 12/1958 | Modes | 222/504 |
|---|---|---|---|
| 3,194,448 | 7/1965 | Theall | 222/43 |
| 3,415,277 | 12/1968 | Mitchell et al. | 222/386.5 |
| 3,465,732 | 9/1969 | Kattchee | 251/129 |
| 3,524,474 | 8/1970 | McCormick | 137/625.61 |
| 3,614,486 | 10/1971 | Smiley | 251/129 |

Primary Examiner—H. Grant Skaggs
Attorney, Agent, or Firm—Robert R. Tipton

[57] ABSTRACT

A housing having an inlet port and an outlet port utilizes a variable volume cavity connected to the housing and includes a device for limiting the volume of the cavity which is alternately filled through the inlet port and exhausted through the outlet port using a spool valve. The spool valve is arranged to prevent continuous communication of fluid between the inlet and outlet ports. The volume of the variable volume cavity can be varied using electro-expansive or piezoelectric apparatus. The spool valve is reciprocated between the inlet and outlet ports using an electromechanical device and a motion amplifier.

3 Claims, 4 Drawing Figures

MICRO-METERING SYSTEM

BACKGROUND OF THE PRIOR ART

This invention relates generally to devices controlling the flow of fluid and in particular to devices for accurately controlling the flow of fluid without permitting the continuous flow of fluid from the inlet port to the outlet port of the device.

The devices of the prior art for controlling the volumetric flow of fluid from an inlet port to an outlet port comprised diaphragm pumps and piston reciprocating pumps which achieved their variation in volumetric fluid flow through the use of variations in length of the pump stroke and frequency of reciprocation. In general, the devices for varying the length of pump stroke in the prior art devices were generally complicated mechanically and not too accurate in their adjustability. When adjusted to very small stroke volumes, for example, 0.1 microliter, the backflow or regurgitation of check valves influences output in a random fashion that renders flow inconsistent. So too were the techniques for varying the reciprocation frequency.

Such devices may be accurate enough for large volume flows but for very small quantities of fluid flow as is required for the infusion of medications to a patient, their accuracy leaves much to be desired.

SUMMARY OF THE INVENTION

The apparatus of the present invention accurately meters small quantities of fluid through the use of a housing having an inlet port and an outlet port between which is located a reciprocating valve which is in fluid communication with a variable volume cavity. Means are provided for limiting the volume of the variable volume cavity either by a fixed amount or by a varying amount using a piezoelectric or electro-expansive apparatus. The valve is reciprocated between the inlet port and the outlet port through the use of either a solenoid, piezoelectric means, mechanical or hydraulic drives.

Two or more valve elements can be incorporated on the valve shaft or spool whereby two or more fluids can be accurately metered relative to each other.

It is, therefore, an object of the present invention to provide a device for controlling the flow of fluid.

It is a further object of the present invention to provide an apparatus for controlling the flow of fluid utilizing a variable volume cavity for accurate metering of the fluid flow.

It is another object of the present invention to provide an apparatus for controlling the flow of fluid in which the inlet and outlet ports are never in continuous fluid communication.

It is a further object of the present invention to provide a device for controlling the flow of fluid in which the volume of the variable volume cavity can be continuously changed.

It is yet another object of the present invention to provide a device for controlling the flow of fluid in which the volume of the variable volume cavity can be continuously varied by piezoelectric or electro-expansive means.

It is still an object of the present invention to provide an apparatus for controlling the flow of fluid in which a spool valve reciprocates between an inlet port and an outlet port to provide fluid under pressure to a variable volume cavity.

It is a further object of the present invention to provide a apparatus for controlling the flow of fluid in which the spool valve is reciprocated between the inlet port and the outlet port using a piezoelectric stack and a motion amplifier.

It is yet another object of the present invention to provide a fluid flow controlling device in which inadvertent over pressurization of the feed reservoir (such as might occur on recharging) will not cause an increase in the controlled fluid flow rate.

These and other objects of the present invention will be manifest upon study of the following detailed description when taken together with the drawings.

DESCRIPTION OF THE PREFERRED EMBODIMENT

Figure 1:
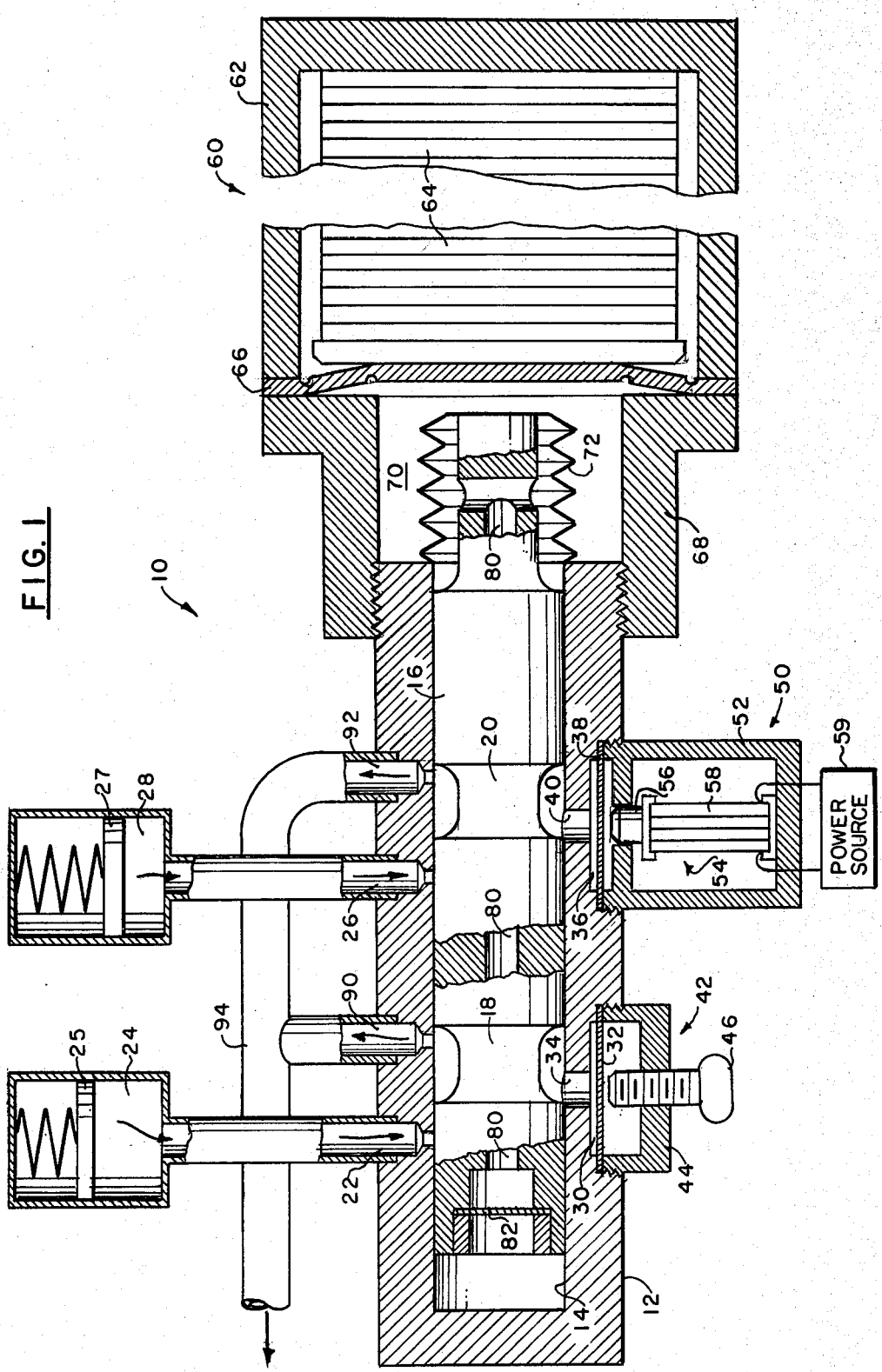
FIG. 1 is a side elevational cut-away view of a typical apparatus for controlling the flow of fluid of the present invention illustrating a dual cavity device.

With reference to FIG. 1 there is illustrated a typical apparatus for controlling the flow of fluid or metering valve 10 of the present invention. In the particular embodiment illustrated in FIG. 1 a dual metering valve is shown, however, a single valve embodiment would operate in the same basic manner.

Metering valve 10 comprises, basically, a primary housing 12 in which is located a cylindrical cavity 14 adapted to receive in a sliding or piston-like relation a spool valve 16. Spool valve 16 further comprises a reduced diameter necked down portion or first valve cavity 18 and a second reduced diameter necked down portion or second valve cavity 20.

A first inlet port 22 is adapted to be in fluid communication between first reservoir 24 and spool valve cavity 18. A second inlet port 26 is adapted to be in fluid communication between second reservoir 28 and spool valve cavity 20.

Metering valve 10 further comprises a first variable volume cavity 30 whose volume is variable through the use of first volume varying diaphragm 32 which is adapted to deflect under pressure of the fluid from first reservoir 24.

The fluid in reservoirs 24 and 28 is maintained under pressure either by the piston and biasing spring arrangement shown or other means such as gas pressure, static hydraulic head or the like common in the art.

First cavity port 34 fluidly communicates first variable volume cavity 30 with spool valve cavity 18.

In a like manner, metering valve 10 further comprises a second variable volume cavity 36 whose volume is variable through the use of second volume varying diaphragm 38.

Second variable volume cavity 36 is in fluid communication with second valve cavity 20 through second cavity port 40.

A first volume limiting apparatus 42 is used to control the maximum volume of first variable volume cavity 30 and comprises a first housing bracket 44 which not only holds first volume varying diaphragm 32 in place and seals it to define first variable volume cavity 30 but also acts to hold set screw 46 which can be adjusted to limit deflection of first volume varying diaphragm 32 and thus the volume of first variable volume cavity 30.

Second volume varying apparatus 50 comprises second housing bracket 52 which acts to seal and hold second volume varying diaphragm 38 in place and also to limit the movement of volume adjusting apparatus 54.

Volume adjusting apparatus 54 comprises a bearing member 56 which is attached or connected at one end to piezoelectric stack 58 and in compression at its other end against second volume varying diaphragm 38. Thus piezoelectric stack 58 and bearing member 56 are all in compression when second volume varying diaphragm is fully deflected, one end of bearing member 56 against second volume varying diaphragm 38 and the other or lower end of piezoelectric stack 58 against housing bracket 52.

Piezoelectric stack 58 is of a type comprising a series of strips of piezoelectric material stacked in lamellar fashion and engaged in the d(31) mode. That is to say, that when voltage is applied by power source 59 transversely between adjacent surfaces, say in the 3 direction, shortening of the longitudinal dimension occurs in the 1 direction. Removal of the voltage potential across the laminations causes the material to regain its original length.

Spool valve 16 is driven in its reciprocating motion by piezoelectric motor 60 which comprises, basically, a first housing 62 contained piezoelectric stack 64 which is placed in compression against Belleville type spring diaphragm 66. A second housing 68 in cooperation with spring diaphragm 66 and one end of housing 12 defines cavity 70 projecting into which is one end of spool valve 16.

A bellows diaphragm 72 is connected about its open base to the end of housing 12 and at its top to the end of spool valve 16. Cavity 70 is filled with an incompressible fluid whereby the expansive motion of piezoelectric stack 64 against spring diaphragm 66 creates a pressure in cavity 70 causing spool valve 16 to be forced into cylinder 14 of housing 12. It can be seen that bellows 72 prevents the flow of fluid in cavity 70 into cylinder 14 to thus prevent any possible contamination of fluid from reservoirs 24 and 28.

Through the center of spool valve 16 is a central communicating channel 80 providing fluid communication from the space inside bellows 72 to the opposite end of spool valve 16 terminating at flexible diaphragm 82. The purpose of this channel is to equalize the pressure at each end of spool valve 16.

First outlet port 90 is provided, in association with first inlet port 22, to exhaust the fluid contained in first variable volume cavity 30 when spool valve 16 is in the position as shown in FIG. 1.

A second outlet port 92 is provided in association with second inlet port 26, to concurrently, with first variable volume cavity 30, exhaust the fluid contained in second variable volume cavity 36 when spool valve 16 is in the position as shown in FIG. 1.

It should be noted that diaphragms 32 and 38 are urged by their natural spring resilience to return to an unloaded, flat condition displaced away from their stops 46 and 56, respectively. This spring action will thus cause fluid from cavities 30 and 36 to be forced out of the cavities through exhaust ports 90 and 92 when spool valve 16 is in the position shown in FIG. 1.

Figure 2:
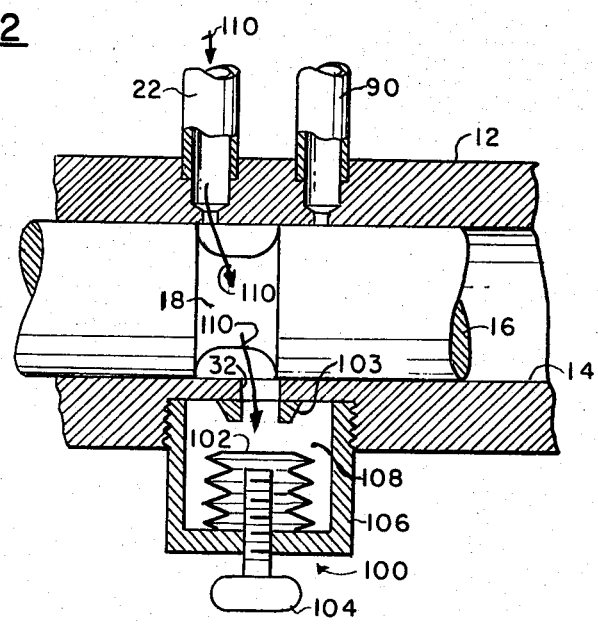
FIG. 2 is cut-away partial view of the apparatus of the present invention showing the spool valve at one end of its stroke permitting the inlet port to communicated with the variable volume cavity.
Figure 3:
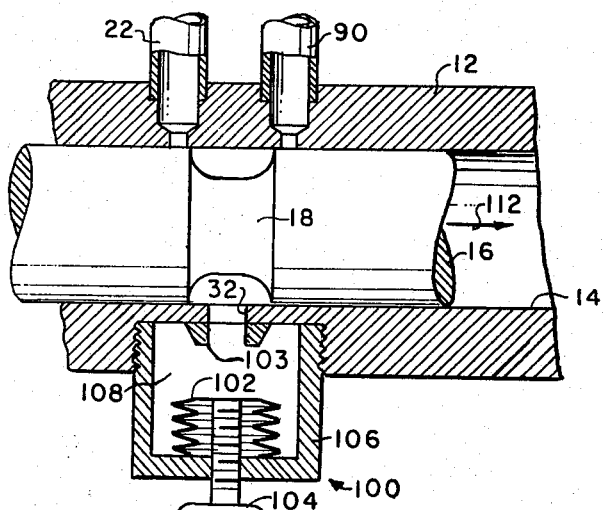
FIG. 3 is a cut-away partial view of the apparatus of the present invention showing the spool valve in its intermediate position blocking the flow of fluid between the variable cavity and the inlet or outlet ports.
Figure 4:
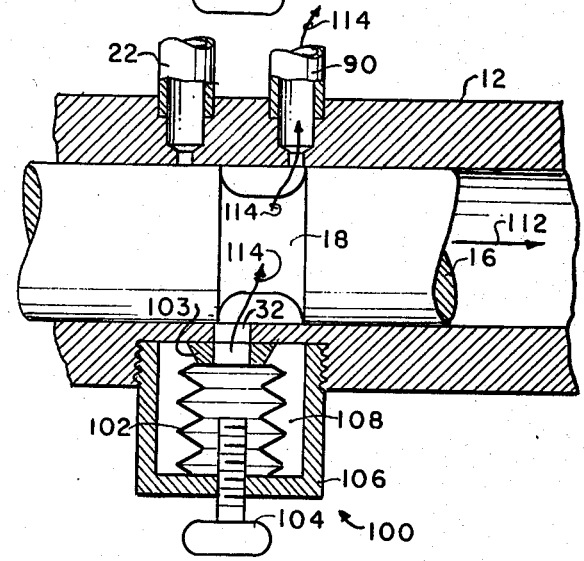
FIG. 4 is a cut-away partial sectional view of the apparatus of the present invention showing the reciprocating spool valve at the opposite end of its stroke fluidly communicating the variable volume cavity with the outlet port.
Figure 2:
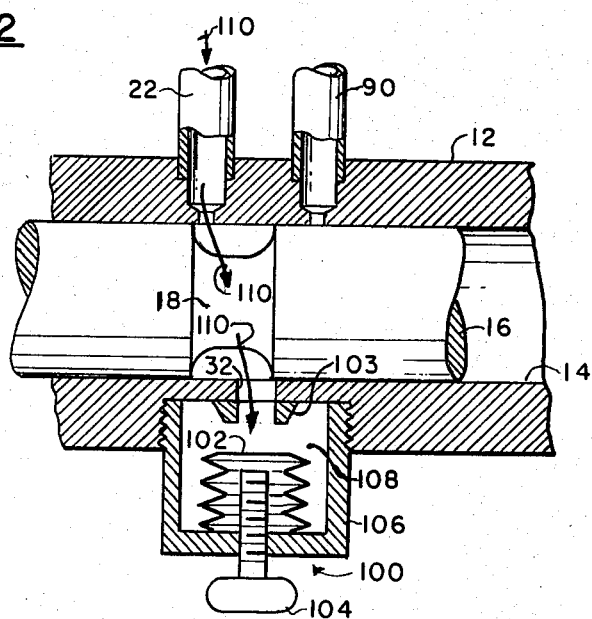
Figure 3:
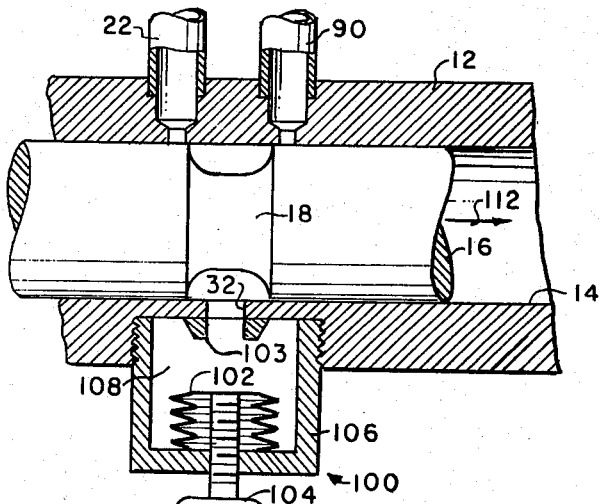
Figure 4:
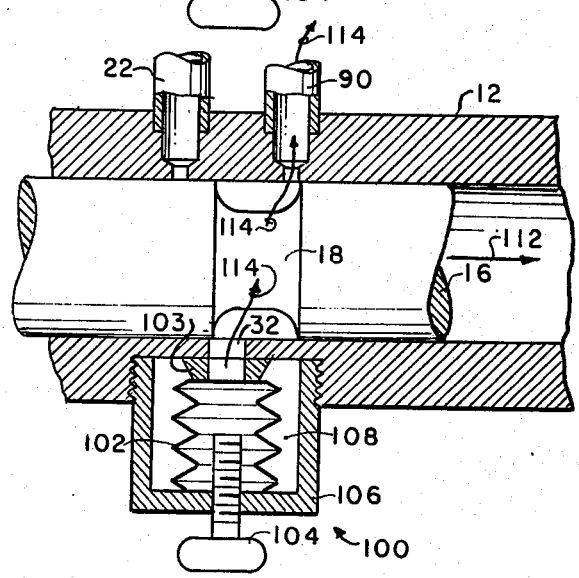

The basic operation of metering valve 10 is shown in FIGS. 2, 3 and 4. In FIGS. 2, 3 and 4 only a portion of valve 10 is shown in cut-away view. In particular, one metering element having an inlet port 22 an an outlet port 90 providing fluid to a third volume limiting apparatus 100 is shown. The rest of the valve configuration is the same as that for FIG. 1.

In FIGS. 2, 3 and 4, third volume limiting apparatus 100 performs the same function as first volume limiting apparatus 42 and second volume limiting apparatus 50 shown in FIG. 1. However, third volume limiting apparatus 100 utilizes a bellows 102, a volume or contraction limiting screw 104 which is connected to housing bracket member 106 and an expansion limiting stop 103.

In FIG. 1, first volume varying diaphragm 32 and second volume varying diaphragm 38 expands to increase the volume of their respective cavities 30 and 36. In FIGS. 2, 3 and 4, bellows 102 contracts in order to increase the volume of third variable volume cavity 108 of volume limiting apparatus 100.

In FIG. 2 spool valve 16 and its reduced diameter necked down portion or cavity 18 is positioned to allow fluid to communicate from inlet port 22 around reduced diameter section 18 through port 32 and into volume 108 of third housing bracket 106. Being under pressure, the fluid will flow as shown by arrows 110 and cause bellows 102 to begin to compress as shown in FIG. 2 away from deflection or expansion limiting stop 103.

As shown in FIG. 3, when sufficient fluid has entered cavity 108 it will compress bellows 102 down to where it is forced against the end of set screw 104 at which time no further fluid can enter volume 108. As shown in FIG. 3, spool valve 16 has moved to the right as shown by arrow 112 to position reduced diameter necked down portion or cavity 18 to be equadistant between inlet port 22 and outlet port 90. It can be seen in FIG. 3, that when spool valve 16 is in this position, fluid can neither flow into reduced diameter portion 18 and cavity 108 nor can fluid flow out of cavity 108 through reduced diameter portion 18. Bellows 102 remains in its compressed condition by the pressurized fluid in cavity 108.

With reference to FIG. 4, spool valve 16 is moved further in the direction of arrow 112 until reduced diameter portion 18 now communicates with outlet port 90, thus permitting the fluid to flow out of cavity 108 forced by the spring compression pressure of bellows 102 which has now expanded to its original volume up to deflection or expansion limiting stop 103.

After fluid has been exhausted from variable volume cavity 108, spool valve 16 will then reverse its direction as shown in FIG. 2, to recycle and repeat the metering process as previously described.

Again with reference to FIG. 1, it can thus be seen as spool valve 16 moves to its farthest left position to permit pressurized fluid to communicate from reservoir 24 through first inlet port 22 to reduced diameter section 18, fluid will enter first variable volume cavity 30 through first cavity port 34 causing first volume varying diaphragm 32 to deflect downward toward set screw 36. As spool valve 16 travels in the opposite direction to the right, it will then cause first outlet port 90 to communicate with reduced diameter portion 18 and first variable volume cavity 30.

Fluid compressed in first variable volume cavity 30 by first volume varying diaphragm 32 will then be forced upward through first cavity port 34 past reduced diameter portion 18 and out first outlet port 90 to manifold or cannula 94. Thus, as spool valve 16 reciprocates back and forth between first inlet port 22 and first outlet port 90 an accurately metered volume of fluid will flow into cannula 94 depending upon the setting of set screw 46.

Concurrently, in a like manner, when spool valve 16 is at its farthest left position, it will permit pressurized fluid to flow from reservoir 28 through second inlet port 36 into reduced diameter portion 20 and then into second cavity port 40 to be maintained under compression in second variable volume cavity 36 by virtue of second volume varying diaphragm 38. The downward motion of second volume varying diaphragm 38 is controlled through the use of second volume adjusting apparatus 54 comprising, as previously described, piezoelectric stack 58 and pressure bearing member 56.

By applying an appropriate voltage to piezoelectric stack 58, bearing member 56 will be moved downward depending upon the magnitude of the applied voltage to limit the deflection of second volume varying diaphragm 38 and thus the volume of second variable volume cavity 36.

Thus it can be seen that the rate or volume of flow of fluid through second outlet port 92 can be made accurately proportional to the flow fluid out of first outlet port 90 by varying the voltage on piezoelectric stack 58. For example, reservoir 24 can contain a quantity of insulin while reservoir 28 can contain a quantity of heparin. If no heparin is needed to be mixed with the insulin, piezoelectric stack 58 is denergized to force second bearing member 56 against second volume varying diaphragm 38 and to prevent any movement thereof. When piezoelectric stack 58 is energized, it shortens to allow the diaphragm to be displaced and to provide a small quantity of heparin to flow into variable volume cavity 36 and out through second outlet port 92 into manifold or cannula 94. Thus the ratio of heparin to insulin flow can be accurately regulated electronically and varied instantly depending upon the control requirements of the patient.

Similarly, diaphragm 32 may, if desired, be controlled by a piezoelectrically driven displacement stop so that the volume of insulin delivered during one excursion of the shuttle valve 16 can also be electronically adjusted.

First and second volume limiting apparatus 32 and 38 can typically be constructed of a flat stainless steel plate 0.0025 mm thick. This design requires about 250 mm Hg pressure to insure displacement against the stop. The stress generated in the diaphragm is less than 3,000 psi. It is much more compact, simpler to fabricate and easier to assure quality that the devices of the prior art.

Typically, piezoelectric motor 60 will be operated at about 16 strokes per second down to about one stroke per minute. At 16 strokes per second, this will give approximately 100 microliters per minute of fluid flow through the metering valve 10 from each of the two reservoirs 24 and 28. The usual fluid inlet pressure will be about 5 psi or about 250 mm Hg pressure to insure displacement of the flexible diaphragms or bellows.

Also, spool, valve 16 may be constructed as a flat plate device having a cavity or hole therein corresponding to cavity 18 or 20 which can be caused to reciprocate between an inlet port, variable volume cavity and an outlet port.

Although the above-described micro-metering system is illustrated as a device for infusing medication fluids into a patient, the apparatus can also be adapted to control the flow of petroleum or other flammable fluids into an internal combustion engine. For example, the variable volume cavities 30 and 36 can be used to meter quantities of fuel injected into a diesel or fuel injection system.

We claim:

1. An apparatus for controlling the flow of fluid comprising
   means defining a primary housing having an inlet port and an outlet port,
   means defining a first variable volume cavity in fluid communication with said primary housing,
   means for varying the volume of said cavity according to pressure of said fluid,
   means for limiting the volume of said variable volume cavity comprising
   means defining a support bracket,
   an electroexpansive member having one end bearing against said support bracket and having the other end bearing against said means for varying the volume of said cavity according to pressure of said fluid, and
   means for applying a voltage across said electroexpansive member whereby said electroexpansive member contracts and expands against said means for varying the volume of said cavity to limit the volume thereof, and
   means for alternately communicating said inlet port with said cavity and said outlet port with said cavity.

2. An apparatus for controlling the flow of fluid comprising
   means defining a primary housing having a first inlet port, a first outlet port, second inlet port and a second outlet port,
   means defining a first variable volume cavity comprising a first flexible diaphragm in fluid communication with said primary housing,
   means defining a second variable volume cavity comprising a second flexible diaphragm in fluid communication with said primary housing,
   means for limiting the volume of said first variable volume cavity comprising
   a first housing bracket attached to said primary housing,
   a set screw adapted to engage said first housing bracket and bear against said first flexible diaphragm,
   means for varying the volume of said second variable volume cavity comprising,
   a second housing bracket attached to said primary housing,
   an electro-expansive member having one end bearing against said second housing bracket and having its other end bearing against said second flexible diaphragm,
   means for applying a voltage to said electro-expansive member whereby said electro-expansive member contracts and expands against said second flexible diaphragm to vary the maximum deflection thereof, and means for alternately communicating said first inlet port with said first cavity concurrently with communicating said second inlet port with said second cavity, and then communicating said first outlet port with said first cavity concurrently with communicating said second outlet port with said second cavity.

3. An apparatus for controlling the flow of fluid comprising means defining a primary housing having an inlet port and an outlet port, means defining a first variable volume cavity in fluid communication with said primary housing, means for varying the volume of said cavity according to pressure of said fluid, means for limiting the volume of said variable volume cavity, and means for alternately communicating said inlet port with said cavity and said outlet port with said cavity comprising a shaft slidably disposed in said housing and adapted to reciprocate therein, means defining a second cavity in said shaft, means for alternately reciprocating said shaft in said primary housing to place said second cavity in said shaft alternately between said inlet port of said housing and said opening of said first variable volume cavity, and between said outlet port of said primary housing and said opening of said first variable volume cavity, said means comprising a stack of piezoelectric elements varying in dimension according to applied voltage, a spring diaphragm adapted to engage one end of said stack of piezoelectric elements and vary in dimension therewith, said spring diaphragm in fluid communication with said shaft, said spring diaphragm comprising a generally planar central member adapted to engage one end of said stack of piezoelectric elements, an outer annular ring support member, a middle annular ring member disposed between said central member and said outer annular ring support member and flexibly connected to each of said members.

* * * * *